US 6,560,493 B1

(12) United States Patent
Dahleh et al.

(10) Patent No.: US 6,560,493 B1
(45) Date of Patent: May 6, 2003

(54) ARCHITECTURE FOR DISTRIBUTED CONTROL OF ACTUATOR AND SENSOR ARRAYS

(75) Inventors: Munther A. Dahleh, Cambridge, MA (US); Bassam Bamieh, Santa Barbara, CA (US); Fernando Paganini, Los Angeles, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/258,528

(22) Filed: Feb. 26, 1999

(51) Int. Cl.[7] .............................................. G05B 13/02
(52) U.S. Cl. .......................... 700/28; 700/30; 700/31; 700/33; 700/51; 700/52; 700/262; 703/2; 703/28; 703/30; 318/561; 318/560
(58) Field of Search ............................ 244/3.1; 703/2, 703/12, 27, 28, 29, 30; 700/28–31, 33, 34, 51–54, 262, 263, 264; 318/561, 560

(56) References Cited

U.S. PATENT DOCUMENTS

| | | | | |
|---|---|---|---|---|
| 6,056,781 A | * | 5/2000 | Wassick et al. | 700/28 |
| 6,134,578 A | * | 10/2000 | Ehlig et al. | 709/100 |
| 6,169,981 B1 | * | 1/2001 | Werbos | 706/15 |
| 6,182,203 B1 | * | 1/2001 | Simar et al. | 712/13 |
| 6,253,307 B1 | * | 6/2001 | Boutaud et al. | 712/209 |
| 6,366,813 B1 | * | 4/2002 | DiLorenzo | 607/45 |

OTHER PUBLICATIONS

Decentralization Properties of Optimal Distributed Controllers, Paganini et al., Dec. 1998, Proceedings of the 37th IEEE conference, pp. 1877–1882.*

The Structure of Optimal Controllers of Spatially–Invariant Distributed Parameter Systems, Bamieh et al., 1997, Proceedings of 36th IEEE Conference, pp. 1–11.*

Robust H2 Control of Vehicular Strings, Shu et al., ASME Journal of Dynamics, Measurement and Control, pp. 1–16.*

State–Space Solutions to Control Problems, Doyle et al., IEEE Transactions on Automatic Control, vol. 34, No. 8, Aug. 1989 pp. 831–847.*

Chu, K.–C., "Decentralized Control of High–Speed Vehicular Strings," *Transportation Science*, pp. 361–383, (Nov. 1974).

Chu, K.–C., "Optimal Decentralized Regulation for a String of Coupled Systems," *IEEE Transactions on Automatic Control*, pp. 243–246, (Jun. 1974).

Melzer S.M. and Kuo, B.C., "Optimal Regulation of Systems Described by a Countably Infinite Number of Objects,", pp. 359–366.

Bamieh, B. et al., "Distributed Control of Spatially–Invariant Systems," pp. 1–36 (May 1998).

* cited by examiner

*Primary Examiner*—Ramesh Patel
(74) *Attorney, Agent, or Firm*—Hamilton, Brook, Smith & Reynolds, P.C.

(57) ABSTRACT

An apparatus for optimal control of distributed actuator and sensor arrays includes a control system having a state estimator including an operator which acts on estimation error through convolution with respect to a spatial variable to generate a state estimate, and a control output generator which applies a control operator to the state estimate through convolution with respect to the spatial variable. A method of designing an optimized control system includes the steps of obtaining a system model, computing a transform of the model with respect to the spatial domain, solving linear matrix inequalities to generate auxiliary variables, performing an inverse transform on the auxiliary variables, and computing an estimator operator and a control operator for a model-based estimator control system.

38 Claims, 3 Drawing Sheets

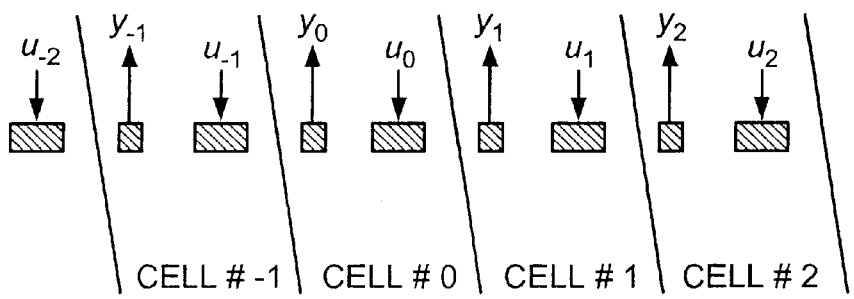
FIG. 5
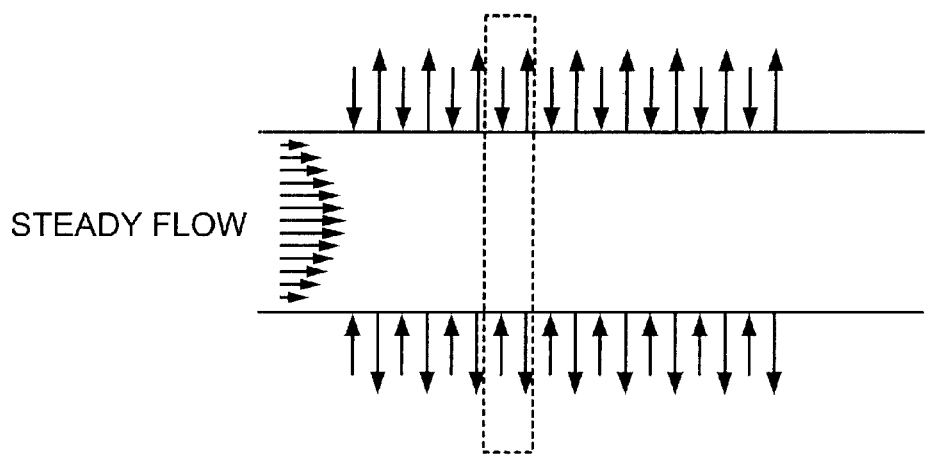
FIG. 6
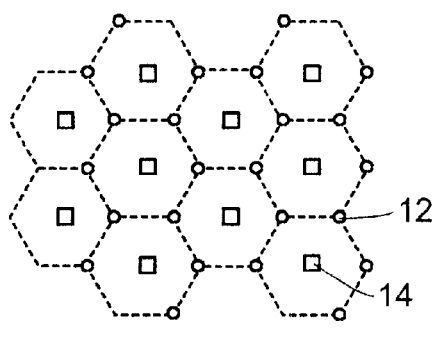 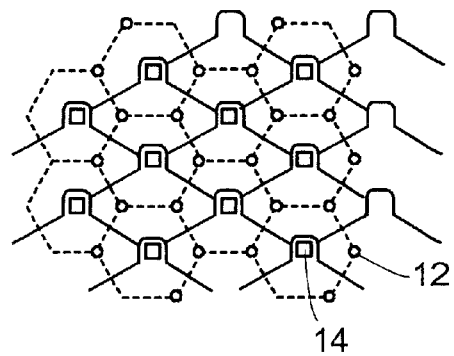
FIG. 7A  FIG. 7B

ARCHITECTURE FOR DISTRIBUTED CONTROL OF ACTUATOR AND SENSOR ARRAYS

GOVERNMENT SUPPORT

The invention was supported, in whole or in part, by grant F49620-95-0219 from AFOSR, and CAREER awards ECS-96-24152 and ECS-9612558 from NSF. The Government has certain rights in the invention.

BACKGROUND OF THE INVENTION

In various control engineering applications, it is desired to regulate some physical variable throughout the length, area, or volume of a medium. Examples can include elimination of vibration in flexible, solid material structures, disturbance elimination in fluid flow, uniform temperature regulation throughout a fluid pool, etc. Until recently, the typical interface between the medium and the controller consisted of a relatively small number of sensors and actuators at fixed locations. The sensors continuously monitor the actual state of the relevant physical variables at their respective locations while the actuators continuously act in real time on the medium in response to controller logic. The controller, which typically comprises a microprocessor, determines the appropriate action on the basis of the sensor readings, predetermined control objectives, and the control algorithm logic.

Recent advancements in micro-electro-mechanical systems (MEMS) have produced microscopic devices with actuating, sensing, computing, and/or telecommunication capabilities. It is preferred to distribute a large array of MEMS in a spatial configuration in order to enhance capabilities for control. Examples can include distributed flow control for drag reduction, "smart" mechanical structures such as a building able to automatically respond to earthquakes, and cross-directional control of large scale paper machines.

However, the increased distribution of MEMS throughout a medium to be controlled has created certain control problems. For example, the current speed and memory capabilities of microprocessors are insufficient to process the multiplicity of sensor readings and control the actuators in a meaningful fashion.

SUMMARY OF THE INVENTION

Prior model-based controller algorithms having employed the following forms:

$$\frac{d}{dt}\psi_K(t) = A_K \psi_k^{(t)} + B_K y(t)$$

$$u(t) = C_k \psi_k(t) + D_k y_k(t)$$

where $\psi_K$ represents an estimate of the present state of a system at time t, A, B, C, and D represents linear operators acting on the system, u represents a control operator be applied to the estimate $\psi_K$, and y represents the output of the system sensed by sensors. The problem with these forms as applied to systems with distributed sensor and actuators is that they do not exploit the spatial dynamics of the system and their structure. Accordingly, a need exists to accurately design controller logic that minimizes quadratic performance criterion in such contexts.

A control system is provided which includes a state estimator including an operator which acts on estimation error through convolution with respect to a spatial variable to generate a state estimate. The control system further includes a control output generator which applies a control operator to the state estimate through convolution with respect to the spatial variable. According to further aspects of the present invention, the operator of the state estimator and the control operator are localized in space, are independent of time, and minimize quadratic objective functions.

Preferably, the control system is controlling a linear shift invariant system, which may be referred to as a spatially invariant system, and is a model-based estimator control system.

A method is also provided for designing a control system which includes the steps of obtaining a system model, computing a transform of the model with respect to the spatial domain, solving linear matrix inequalities to generate auxiliary variables, performing an inverse transform on the auxiliary variables, and computing an estimator operator and a control operator for a model-based estimator control system.

Preferably, the step of computing a transform of the model with respect to the spatial domain is accomplished using a Fourier transform, and the step of solving linear matrix inequalities to generate auxiliary variables is accomplished using algebraic Ricatti equations.

According to yet further aspects of the present invention, the estimator operator acts on estimation error through convolution with respect to a spatial variable to generate a state estimate. A control output generator applies the control operator to the state estimate through convolution with respect to the spatial variable.

According to yet another aspect of the present invention, a control system is provided which includes means for estimating a state including an operator which acts on estimation error through convolution with respect to a spatial variable to generate a state estimate, and means for generating a control output including applying a control operator to the state estimate through convolution with respect to the spatial variable.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 illustrates a material with a plurality of arrays and sensors in accordance with the present invention.

FIG. 6 illustrates Poiseuille flow with active boundary control in accordance with the present invention.

FIGS. 7A and 7B illustrate distribution of sensors and actuators throughout a medium in accordance with the present invention.

DETAILED DESCRIPTION OF THE INVENTION

Generally, the present invention comprises a control system that optimally controls a predetermined characteristic(s) or property(ies) of a medium. A discussion of the present invention is found in *Optimal Control of Distributed Actuator and Sensor Arrays,* Bamieh B., Paganini F., and Dahleh M. SPIE Proceedings, Vol. 3323, March 1998, the contents of which are incorporated by reference herein in its entirety.

Figure 1A:
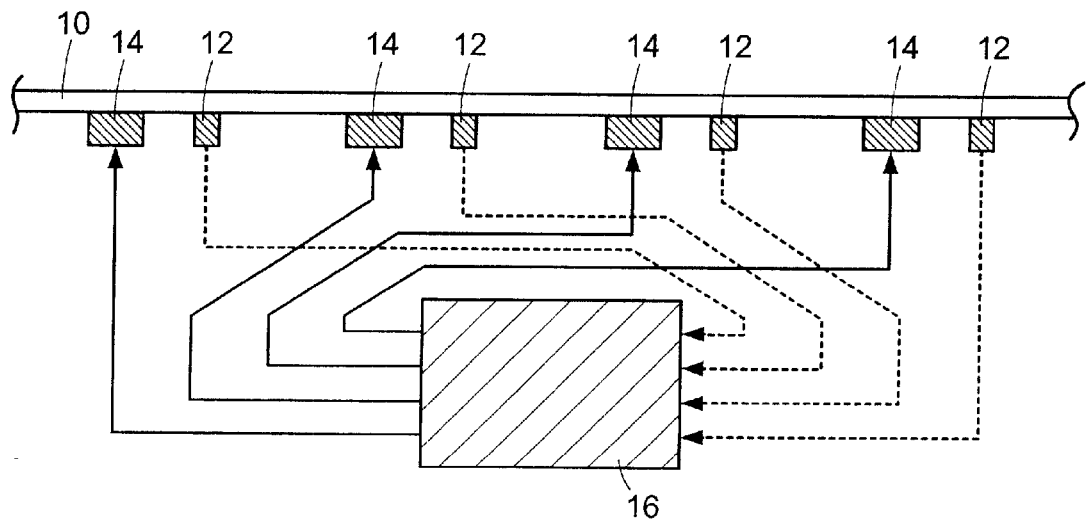
FIGS. 1A and 1B illustrate exemplary applications employing the teachings of the present invention.
Figure 1B:
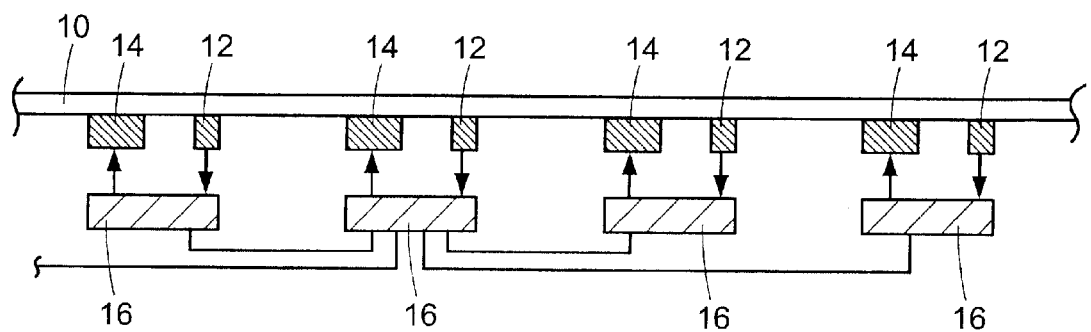

Turning to FIGS. 1A and 1B, exemplary applications of the present invention are described. A rod 10 which has a number of sensors 12 distributed along its longitudinal axis sense an output of the rod. In this example, rod 10 is assumed to be infinite in length. Typically, the output of the medium is referred to by the variable y. For example, sensors 12 sense a heat output of the rod 10 at discrete locations, typically referred to by the variable x. As particularly shown in FIG. 1A, each sensor 12 is in communication with a controller 16 which is programmed to respond to the output of the medium and, according to programmed logic, respond there to by controlling actuators 14. Each actuator 14 is also in communication with controller 16. In this example, actuators 14 can act on the rod 10 to maintain it at a predetermined temperature. In a preferred embodiment of the present invention, controller 16 includes a microprocessor.

As the number of sensors 12 and actuators 14 increase with the development of micro-electro-mechanical systems (MEMS), it becomes necessary, due to considerations such as microprocessor speeds and computational error propagation, to limit the number of sensors from which the controller receives input, in order to achieve a predetermined control strategy. An exemplary illustration is shown in FIG. 1B wherein a sensor 12 and an actuator 14 are in communication with a particular controller 16. Each controller 16 communicates with neighboring controllers to receive output from a number of sensors 12 in the neighborhood of the actuator 14 the particular controller 16 is controlling. The present invention fulfills a need to calculate exact solutions for optimal control problems, i.e., a systematic way for designing controller logic that minimizes quadratic performance criterion.

To calculate these solutions, it is assumed that the medium being controlled is spatially invariant, which is to say that the dynamic properties of the medium are essentially the same viewed at different points in space. Also, it can be assumed that the systems discussed herein are dimensionally infinite. However, for the spatially invariant class, it is shown below that quadratically optimal controllers can be designed by solving parameterized families of finite-dimensional problems via parameterized families of matrix Ricatti equations. This essentially an exact solution of the infinite dimensional problem.

It is also shown below that the optimal infinite-dimensional controllers have an inherently semi-decentralized architecture, which is referred to herein as "localized." This architecture generally comprises a distributed infinite array of finite dimensional controllers with separation structure, and observer operator (referred to herein as an estimator operator L) and control operators (referred to herein by the variable F) which are spatial convolutions. It has been found that the corresponding convolution kernels (which determine the communication requirements in the controller array) have exponential rates of decay spatially. This allows us to obtain an arbitrarily close to optimal, localized controller architecture.

The notion of spatial invariance should be viewed as the counterpart to time invariance for spatio-temporal systems. It has been found that for spatially invariant plants, one can restrict attention to spatially invariant controllers without any loss of performance. This fact provides a signification of controller implementation and design, and further generalizes our results on quadratic problems. We prove this invariance property for large class of systems and induced-norm robust control measures.

Figure 2:
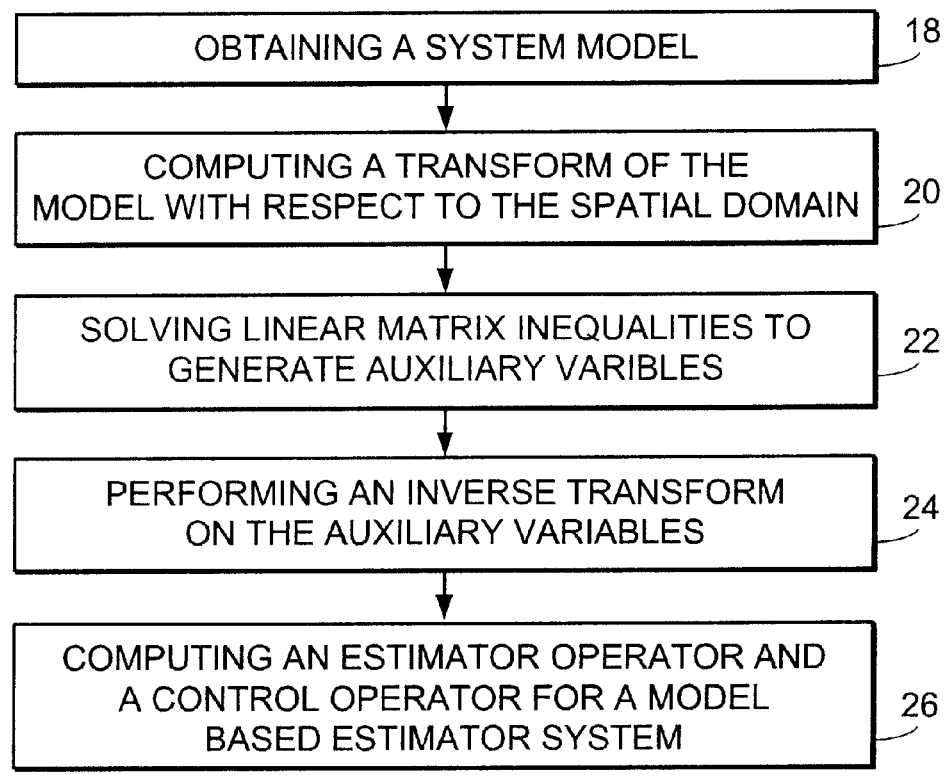
FIG. 2 is a flow chart of the steps performed in calculating optimal controller performance in accordance with the present invention.

A flowchart outlining the strategy for designing a control system that accurately optimizes control of a predetermined characteristic of a medium is provided in FIG. 2. The first step 18 is to obtain a system model, examples of which are provided below. Second, a transform of the model with respect to the spiral domain is computed at step 20. Although a number of transforms can be used, a Fourier transform is preferred. Third, for each frequency, linear matrix inequalities are solved to generate auxiliary variables at step 22. Although different linear matrix inequalities can be used, algebraic Ricatti equations (ARE's) are preferred. Fourth, an inverse transform is performed on the auxiliary variables at step 24. Fifth, an estimator operator (L) and a control operator (F) are computed for a model-based estimator system at step 26.

1 Mathematical Preliminaries

In this section we introduce a formalism to study the question of spatial invariance in distributed dynamical systems. In full generality, spatial invariance can be defined whenever a group of symmetries acts on the spatial coordinates, and the dynamics commute with this group. In this description we will restrict ourselves to the special case when some spatial variables themselves form a group, and the symmetries considered are translations in this group.

1.1 Groups, Translations and Invariance

In the sequel, G will denote a locally compact, abelian (LCA) group. Special cases of this include:

1. $G=R$
2. $G=\partial D$ (unit circle).
3. $G=Z$.
4. $G=Z_p$, (finite group of integers modulo p).

In addition, one can consider direct products of such spaces, $G:=G_1 \times \ldots \times G_d$, e.g. $R^d$, $Z^d$, or the cylinder $\partial D \times R$. Such examples cover all the cases of interest in this discussion, but still the abstract formulation is convenient to treat all cases at once. In this discussion, the group G will represent a number of spatial coordinates, each varying in one of the above groups. There may also be additional coordinates in the problem; in other words, signals will have the form $\mu(x,\xi,t)$, where $x=(x_1, \ldots, x_d)$ varies in a group $G:=G_1 \times \ldots \times G_d$, $\xi$ contains additional spatial coordinates varying in some set, and t is (discrete or continuous) time.

The group operation (denoted by +, in the case of $\partial D$ this corresponds to addition of arcs) introduces a translation map $x \rightarrow x+x_c$ on G, and a translation operator for functions on G in the natural way: $(T_{x_o}f)(x)=f(x-x_o)$. There is a natural measure on G which is invariant under translations, and positive over open sets; this is called the Haar measure and is unique up to normalization, (e.g., Lebesgue measure in R or $\partial D$, counting measure on Z or $Z_n$). We denote it by dx. We will be mainly concerned with complex functions on G which are square integrable with respect to the Haar measure:

$$\mathcal{L}_2^n(G) := \left\{ f: G \to \mathbb{C}^n \mid \|f\|_2^2 := \int |f(x)|^2 dx < \infty \right\} \quad (1)$$

An operator $A:D(A) \to L_2^m(G)$ with domain $D(A) \subset L_2^n(G)$ is said to be translation invariant if $T_x:D(A) \to D(A)$ and $AT_x = T_x A$ for every translation $T_x$. Two important examples are:

● For $G=R$, the differentiation operator $$A: f(x) \mapsto \frac{\partial f}{\partial x} \quad (2)$$

The domain of this operator is the set of functions in $L_2(R)$ with derivative in $L_2(R)$; it is clear that A is translation invariant. Note that A is unbounded, but it is a closed operator with dense domain; due to their importance in partial differential equation models, the theory of distributed parameter systems is usually developed for this larger class.

● A spatial convolution: let $H_x$ be a family of operators indexed over $X \in G$, and define $$H:f(x) \to \int_G H_{x-\zeta} f(\zeta) d\zeta, \quad (3)$$

where the integral corresponds to the Haar measure. Under appropriate assumptions, this operator is well defined and spatially invariant.

1.2 Fourier analysis on groups

One of the main advantages of the spatial invariance property over a group, is that Fourier transforms can be introduced to diagnoalize the relevant operators, in the same way as time invariance is exploited in standard system theory. This section contains a brief overview of Fourier analysis over groups.

General Fourier analysis (also known as commutative harmonic analysis) consists on mapping functions on G to functions on a dual group $\hat{G}$; in full generality, $\hat{G}$ can be identified with the set of homomorphisms from G to $\partial D$; for our purposes it suffices to consider the following table, where the entries correspond to the Fourier transform, Fourier series, Z-transform, and discrete Fourier transform respectively:

| G | R | $\partial D$ | Z | $Z_p$ |
|---|---|---|---|---|
| $\hat{G}$ | R | Z | $\partial D$ | $Z_p$ |

The Fourier transform F associates a function $\{f(x)\}$ on G with a function $\{\hat{f}(\lambda)\}$ on $\hat{G}$. A few properties are
1. F is linear
2. F transforms convolutions into products
3. With appropriate normalizations in the measures $dx$ and $d\lambda$, F is an isometric isomorphism from $L_2(G)$ to $L_2(\hat{G})$; in particular the Plancherel theorem states that $$\|f\|_2^2 = \int_G |f(x)|^2 dx = \int_\Lambda |\hat{f}(\lambda)|^2 d\lambda = \|\hat{f}\|_2^2 \quad (4)$$

The last property above implies that one can identify the spaces $L_2(G)$ and $L_2(\hat{G})$; in particular, every operator A on $L_2(G)$ is identified with an operator $\hat{A}=F\ AF^{-1}$ on $L_2(\hat{G})$. This procedure is particularly useful for translation invariant operators, as they become multiplication operators in the transform domain. The following proposition essentially follows from V. P. Khavin, "Methods and Structure of Commutative Harmonic Analysis", in *Commutative Harmonic Analysis I*, V. P. Khavin, and N. K. Nikil'skij (Eds.), Springer Verlag, 1990.

Proposition 1 Let $A : D(A) \to L_2^{2m}(G)$ be a translation invariant on a dense domain $D(A) \subset L_2^n(G)$. Then the corresponding operator $\hat{A}: D(\hat{A}) \to L_2^m(\hat{G})$, $D(\hat{A}) \subset L_2^n(\hat{G})$ is a multiplication operator: in other words, there exists a matrix-valued function $\{\hat{A}(\lambda)\}:\hat{G} \to \mathbb{C}^{m \times n}$ such that $$[\hat{A}\hat{f}](\lambda) = \hat{A}(\lambda)\hat{f}(\lambda) \quad (5)$$

almost everywhere, for every $\hat{f} \in D(\hat{A})$.

In what follows, we will consider operators A for which the Fourier representation $\hat{A}(\lambda)$ is continuous in $\lambda$; this is a general enough class which includes spatial convolutions with kernels in $L_1(G)$, as well as the differentiation operators which appear in partial differential equation (PDE) models.

2 Spatial Invariance with Full Actuation: State-Space Models

This paper is concerned with spatio-temporal systems where the relevant signals are indexed by a spatial coordinate in addition to time. In this section we focus on a special class of control problems, where 1. All the spatial coordinates, denoted collectively by x, vary in a group G. Modulo this coordinate, the dynamics are finite dimensional.
2. The system actuators and sensors are fully distributed over this coordinate.
3. The dynamics are spatially invariant with respect to translations in this coordinate.

To be more precise, we adopt a state-space description for this class of systems. The first two assumptions imply that if $\psi$, $\mu$ and $\gamma$ denote the state, input, and output spaces respectively, $\dim\{\psi/G\}$, $\dim\{\mu/G\}$, $\dim\{\gamma/g\}$, are all finite. In other words they can be expressed as vector-valued functions $\psi(x,t), \mu(x,t)$ and $\gamma(x,t)$. A general linear system is thus of the form (in continuous time)

$$\frac{\partial}{\partial t} \psi(x,t) = A\psi(x,t) + Bu(x,t) \quad (6)$$

$$y(x,t) = C\psi(x,t) + Du(x,t), \quad (7)$$

The entire treatment will be in terms of $L_2$ signal spaces: in (6–7), at a fixed instant of time the signals $\psi, \mu$ and $\gamma$ are assumed to be elements of $L_2^n(G)$ (respectively $L_2^p(G)$ and $L_2^r(G)$) for some finite vector dimensions n, p, r. A, B, C, D are translation invariant operators between spaces $L_2(G)$ of appropriate dimensions, and are static (no dependence on t). The third assumption above means that these operators are translation invariant, in the sense defined in Section 1. For example, A, B, C, D could be matrices whose elements are PDE operators (in x) with constant coefficients.

In general, some of the operators will be unbounded, so the notion of a solution to (8) requires some care, and involves the theory of $C_0$ semigroups of operators.

2.1 Examples

We provide a few illustrative examples of the kinds of systems which fit this formulation. Other examples where full actuation is not available are discussed in Section 5.

The Heat Equation with Distributed Control and Measurements

Consider the dynamics of heat transfer system model or diffusion in an infinite homogeneous medium with distributed control:

$$\frac{\partial \psi}{\partial t}(x, t) = c\frac{\partial^2 \psi}{\partial x^2}(x, t) + u(x, t), \tag{8}$$

where $\psi$ is the material's temperature, and $\mu$ is the control input. Since the A operator, $c\partial^2/\partial x^2$, is a PDE operator with constant coefficient, it is spatially invariant.

Vehicular Strings (Platoons)

This problem initially attracted attention in the late 60's and early seventies. The problem treated is longitudinal control of a linearized infinite string of vehicles.

If each vehicle in an infinite string is modeled as a moving mass with second order dynamics (with normalized coefficients), we obtain:

$$\frac{d}{dt}\begin{bmatrix} p_i \\ v_i \end{bmatrix} = \begin{bmatrix} 0 & 1 \\ 0 & 0 \end{bmatrix}\begin{bmatrix} p_i \\ v_i \end{bmatrix} + \begin{bmatrix} 0 \\ u_i - u_{i-1} \end{bmatrix} + \begin{bmatrix} 0 \\ w_i - w_{i-1} \end{bmatrix}, i \in \mathbb{Z}$$

where $p_i$, $v_i$ are the relative position and velocity errors between the i'th and (i−1) vehicle respectively, $u_i$, $w_i$ are the control and disturbance inputs into the i'th vehicle. In such a problem, it is typically desired to regulate errors down to zero, and this can be captured by quadratic performance objective such as:

$$J = \sum_{i \in \mathbb{Z}} \int_0^\infty (\alpha_1 p_i^2(t) + \alpha_2 v_i^2(t) + \alpha_3 u_i^2(t))dt.$$

Note that in the above model, the A operator is obviously spatially invariant. The B operator is actually $[0\ I-T_{-1}]'$, where $T_{-1}$ is the operator of translation by −1. And as usual, we can clearly define a regulated output whose $L_2$ norm is the quadratic objective defined above. All the system operators thus defined will be spatially invariant. One can then pose distributed $H_2$ and $H_\infty$ problems for such systems. The $H_2$ is concerned with minimizing RMS values of the error output, while $H_\infty$ is concerned with minimizing the worst case RMS value in the presence of a class of disturbances. We finally note here that the stability of the distributed system implies the so-called "string stability" of the vehicular platoon.

A Contrived Example

As a final example which illustrates other invariances that can be treated with this framework, consider the following system where the spatial domain is $G=R\times Z$:

$$\frac{\partial^2 \psi}{\partial t^2}(x, k, t) = \tag{9}$$

$$\frac{\partial^2 \psi}{\partial x^2}(x, k, t) + \alpha_0\psi(x - \bar{x}, k, t) + \alpha_+\psi(x, t+1, t) + u(x, k, t),$$

which can be thought of as a discrete array of one dimensional media. Each medium has dynamics given by a wave equation (in x) with coupling (with coefficient $\alpha_+$) from neighboring media, and from a distance $\bar{x}$ within the same array element. The control in the above equation is fully distributed. We can rewrite these dynamics in the standard form ($\delta$) by introducing an extra state variable:

$$\frac{\partial}{\partial t}\begin{bmatrix} \psi_1(., k, t) \\ \psi_2(., k, t) \end{bmatrix} = \tag{10}$$

-continued $$\begin{bmatrix} 0 & 1 \\ \frac{\partial^2}{\partial x^2} + \alpha_0 T_{(\bar{x},0)} + \alpha_+ T_{(0,1)} & 0 \end{bmatrix}\begin{bmatrix} \psi_1(., k, t) \\ \psi_2(., k, t) \end{bmatrix} + \begin{bmatrix} 0 \\ 1 \end{bmatrix}u(., k, t),$$

where $T_x$ are the aforementioned translation operators.

2.2 Block-Diagonalization

The main observation we will exploit in the next few sections is that by taking a Fourier transform, the system (6–7) is diagonalized into the decoupled form $$\frac{d}{dt}\hat{\psi}(\lambda, t) = \hat{A}(\lambda)\hat{\psi}(\lambda, t) + \hat{B}(\lambda)\hat{u}(\lambda, t) \tag{11}$$

$$\hat{y}(\lambda, t) = \hat{C}(\lambda)\hat{\psi}(\lambda, t) + \hat{D}(\lambda)\hat{u}(\lambda, t) \tag{12}$$

where $\hat{A}(\lambda), \hat{B}(\lambda), \hat{C}(\lambda), \hat{D}(\lambda)$ are multiplication operators in accordance to Proposition 1. Now, the transformed system (11–12) is in effect a decoupled family of standard finite dimensional linear time invariant (LTI) systems over the frequency parameter $\lambda$.

For instance, the equations (10) of the earlier example become:

$$\frac{d}{dt}\begin{bmatrix} \hat{\psi}_1(w, \theta, t) \\ \hat{\psi}_2(w, \theta, t) \end{bmatrix} =$$

$$\begin{bmatrix} 0 & 1 \\ -w^2 + \alpha_0 e^{-j\bar{\xi}w} + \alpha_+ e^{j\theta} & 0 \end{bmatrix}\begin{bmatrix} \hat{\psi}_1(w.\theta, t) \\ \hat{\psi}_2(w.\theta, t) \end{bmatrix} + \begin{bmatrix} 0 \\ 1 \end{bmatrix}\hat{u}(w.\theta, t),$$

where we have used the Fourier transform in the $\xi$ coordinate, and the z-transform (with $z=e^{j\theta}$) for the k coordinate.

We now proceed to briefly discuss how some basis system-theoretic concepts can be treated with this diagonalization.

Stability

The decoupling achieved by Fourier transformation allows for standard techniques from finite dimensional system theory to be applied to these distributed problems. Consider first the question of stability of the autonomous equation $$\frac{\partial}{\partial t}\psi = A\psi \tag{13}$$

with $\psi \in L_2(G)$. Definitions of stability, asymptotic stability and exponential stability have been studied for such systems, which extend, with some complications, the finite dimensional theory. In the translation invariant case, this question can be studied by means of the diagonalized system $d/dt\hat{\psi}=\hat{A}\hat{\psi}$.

We will assume that the operator A generates a strongly continuous ($C^{10}$) semigroup on $L_2(G)$, which we refer to as $\{T(t)\}$.

Definition 1 The system (13) is exponentially stable if $$\|T(t)\| \leq Me^{-\alpha t}, t \geq 0,$$

for some M, $\alpha > 0$.

It turns out that checking exponential stability is almost equivalent to checking "pointwise" the stability of the decoupled systems.

Theorem 2 If A is the generator of a strongly continuous semigroup, then the following two statements about the system (13) are equivalent:

1. The system is exponentially stable.
2. For each $\lambda \in \hat{G}$, $\hat{A}(\lambda)$ is stable, and the solution of the family of matrix Lyapunov equations $$\hat{A}^*(\lambda)P(\lambda)+P(\lambda)\hat{A}(\lambda)=-I \quad (14)$$

is bounded, i.e. $\sup_{\lambda \in \hat{G}} \|P(\lambda)\| < \infty$.

Proof: 2→1: This follows. The solution P is a bounded Hermitian operator such that $V(\psi):=<P\psi, \psi>$ is a Lyapunov function for the system. 1→2: The semigroup $T(t)$ is actually a semigroup of multiplication operators on $L_2(\hat{G})$ (multiplication by $e^{\hat{A}(\lambda)t}$); therefore exponential stability implies;

$$\sup_{\lambda \in \hat{G}} \lambda_{\max}\left(e^{t\hat{A}^*(\lambda)} e^{t\hat{A}(\lambda)}\right) \leq M^2 e^{-2\alpha t}.$$

Therefore, if we define $P(\lambda)$ to be the solution of (14) for each $\lambda$, we can bound:

$$\|P(\lambda)\| \leq \int_0^\infty \lambda_{\max}\left(e^{t\hat{A}^*(\lambda)} e^{t\hat{A}(\lambda)}\right) dt \leq \int_0^\infty M^2 e^{-2\alpha t} dt < \infty$$

independently of $\lambda$.

The above theorem then implies that checking exponential stability can be handled by finite dimensional tools plus a search over $\lambda$.

Stabilizability

Similar statements can be made about the question of stabilizability of the system:

$$\frac{\partial}{\partial t}\psi = A\psi + Bu \quad (15)$$

Definition 2 The system (15) is exponentially stabilizable if there exists an operator $F:D(A)\to D(B)$ such that $A-BF$ generates an exponentially stable $C^{10}$ semigroup on $L_2(G)$.

It turns out that checking stabilizability can be done by a pointwise solution to a parameterized family of finite dimensional Riccati equations.

Theorem 5 Let A be the generator of a $C^{10}$ semigroup. Then, the system in (15) is exponentially stabilizable if and only if the following two conditions hold:

1. For all $\lambda \in \hat{G}$, the pair $(\hat{A}(\lambda), \hat{B}(\lambda))$ is stabilizable.
2. The solution of the family of matrix Riccati equations $$\hat{A}^*(\lambda)P(\lambda)+P(\lambda)\hat{A}(\lambda)-P(\lambda)\hat{B}(\lambda)\hat{B}^*(\lambda)P(\lambda)+I=0. \quad (16)$$

is bounded, i.e. $\sup_{\lambda \in \hat{G}} \|P(\lambda)\| < \infty$.

Proof: We first note that condition 1 implies that $\forall \lambda$ there exists a positive definite stabilizing solution to the ARE (16), and we require condition 2 to insure that this results in a bounded operator on $L_2(\hat{G})$.

Sufficiency: is clear since $V(\psi):=<P\psi,\psi>$ Lyapunov function for the closed loop system with feedback $-B^*P$.

Necessity: This follows from the result which concludes that there must exist a unique bounded Hermitian solution to a weak operator version of eq. (16). In this case, that solution gives the value function $V(\psi)=<P\psi, \psi<$ to the related linear quadratic regulator (LQR) problem. The value function is clearly spatially invariant, and therefore the corresponding Hermitian operator P is spatially invariant. Thus the operator ARE collapses to equation (16), together with the boundedness condition.

We remark here that the above two theorems imply that checking stability or stabilizability of spatially-invariant systems can be done by checking the same condition for the finite dimensional decoupled systems for every frequency $\lambda \in \hat{G}$. The extra condition of checking the boundedness of the solution to the Lyapunov and Riccati equation is not needed when the group $\hat{G}$ is compact (i.e. for the case of spatially discrete systems $G=Z,Z_n$), since then boundedness is immediate. This result is then very similar to results on so-called spatio-temporal systems from the theory of systems over rings. We summarize this in the following corollary.

Corollary 4 If the group $\hat{G}$ is compact, then
1. The system in (13) is exponentially stable if and only if $\forall \lambda \in \hat{G}$, the matrix $\hat{A}(\lambda)$ is stable.
2. The system in (15) is exponentially stabilizable if and only if $\forall \lambda \in \hat{G}$, the matrix pair $(\hat{A}(\lambda), \hat{B}(\lambda))$ is stabilizable.

We note here that in the compact case, no technical assumptions on the operators A,B are necessary other than the continuity of the matrix-valued functions $\{\hat{A}(\lambda)\}$, $\{\hat{B}(\lambda)\}$, which then imply that A,B are bounded operators on $L_2(G)$.

3 Optimal Control with Quadratic Measures

We now discuss briefly the possible settings for optimal and robust control problems for such systems. There are two possible lines of investigation. The first would be to combine the spatial Fourier transform with a Laplace transform over time to obtain a multidimensional system transfer function. To illustrate, assume that (13) is exponentially stable, then $(sI-A)$ has a bounded inverse for $Re(s) \geq 0$, and we can define $$\underline{H}(\lambda,s)=\hat{C}(\lambda)(sI-\hat{A}(\lambda))^{-1}\hat{B}(\lambda)+\hat{D}(\lambda) \quad (17)$$

which is a p×r matrix-valued function on $\hat{G} \times \{Re(3) \geq 0\}$, continuous in $\lambda$ and analytic in s. Then analysis and synthesis problems for such systems become equivalent problems for a certain class of multi-dimensional systems. In this setting causality (or stability) for both plants and controllers is only relevant with respect to the variable s, and not the spatial transform variable $\lambda$. This is a crucial difference between these problems and other multi-dimensional systems problems.

Another approach which is more expedient for quadratic problems, is to transform only the spatial variables, as was done in (11-12). The main observation is that since $L_2$ norms are preserved by the Fourier transform, any optimal control problem on (6-7) involving quadratic signal norms (e.g. LQR, $H_2$ or $H_\infty$ problems, see below) will be equivalent to an analogous problem for (11-12). The implications of this conversion arc that we can effectively attack the distributed problem by means of a parameterized family of finite dimensional state space problems.

3.1 The Distributed Linear Quadratic Regulator

We begin by studying the distributed LQR problem; as understood in the art, characterizing the optimum in terms of a solution to an operator Riccati equation, in an analogous fashion to the finite dimensional theory. Such equations are difficult to solve in general, however, and to our knowledge this has only been attempted for specific examples. What has not been emphasized in the prior art is that, for the relatively large class of translation invariant problems, the problem diagonalizes exactly into a parameterized family or finite dimensional LQR problems. This is now explained; for simplicity only the infinite horizon problem is discussed.

Consider the problem of minimizing the functional $$J=\int_0^\infty (Q\psi,\psi)+(Ru,u)dt \quad (18)$$

subject to the dynamics (6), and $\psi(x,0)=\psi_0(x)\in L_2(G)$. We assume that A,B,Q and R are translation invariant operators.
Q and R are strictly positive definite operators.
(A,B) is exponentially stabilizable.

By using spatial transforms, the problem can then be rewritten as the minimization of $$J=\int_G \int_0^\infty (\hat{\psi}(\lambda,t)^*\hat{Q}(\lambda)\hat{\psi}(\lambda,t)+\hat{u}(\lambda,t)^*\hat{R}(\lambda)\hat{u}(\lambda,t))dt\,d\lambda \qquad (19)$$

subject to (11) and $\hat{\psi}(\lambda,0)=\hat{\psi}_0(\lambda)$. Now it is clear from (19) and (11) that the problem decouples over $\lambda$, that is, it is "block-diagonal" with the blocks parameterized by $\lambda$. At a fixed $\lambda$ it amounts to no more than a classical finite-dimensional LQR problem. Therefore the unique solution to this problem is achieved by the translation invariant state feedback $u=-R^{-1}B^*Px$, where $\hat{P}(\lambda)$ is the positive definite solution to the parameter-dependent algebraic Riccati equation.

$$\hat{A}(\lambda)^*\hat{P}(\lambda)+\hat{P}(\lambda)\hat{A}(\lambda)+\hat{Q}(\lambda)-\hat{P}(\lambda)\hat{B}(\lambda)\hat{R}(\lambda)^{-1}\hat{B}(\lambda)^*\hat{P}(\lambda)$$
$$=0\,\forall\lambda\in\Lambda \qquad (20)$$

The main observation here is that when A,B,Q,R are translation invariant operators, then the solution to the operator ARE in the LQR problem is also a translation invariant operator. The exact condition under which this yields a stabilizing controller are:

Theorem 5 Consider the LQR problem (18), (6), where A,B,Q,R are translation invariant operators, with $\hat{R}(\lambda)>0$, $\hat{Q}(\lambda)\geq 0$. If (A,B), and $(A^*,Q^{1/2})$ are exponently stabilizable, then 1. The solution to the family of matrix ARE's in (20) is uniformly bounded, i.e. $\sup_{\lambda\in\hat{G}} P(\lambda)<\infty$.
2. The translation invariant feedback operator $K=-R^-_1B^*P$ is exponentially stabilizing.

Proof: As in the proof of Theorem 3, this follows from Cor. 4.17, Thm. 4.18] in R.F. Curtain and A.J. Pritchard, *Infinite Dimensional Linear Systems Theory*, Lecture Notes in Control and Information Sciences, vol. 8, Springer-Verlag, A1978. after noting that the solution of the operator ARE must be a spatially invariant operator. This follows from the spatial invariance of the value function of the LQR problem. This last fact is clear: if A,B,Q,R are spatially invariant operators, then for any initial state $\psi_o$, we have from the LQR problem definition that $V(\psi_o)=V(T_x\psi_o)$, where $T_x$ is any translation.

We should note here that the above is a generalization of the notion of solving certain LQR problems by so-called modal decomposition. The important difference is that in discussion we do not advocate the standard modal truncation as the method to implement a finite dimensional approximation of the optimal infinite dimensional controller. Instead, we will proceed further and analyze the properties of the resulting feedback operators. This will yield a more natural approximation scheme than modal truncation. These issues will be studied in Section 4.2.

3.2 $H_2$ and $H_\infty$ Control

Figure 3:
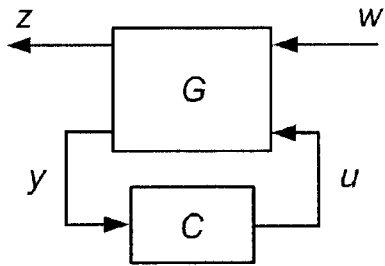
FIG. 3 illustrates a standard control system in accordance with the present invention.

In this section we go a step further and consider distributed disturbance rejection problems with the standard configuration of FIG. 3.

The generalized plant G is a linear, space/time invariant distributed system, which admits a state-space representation as in (6-7). The feedback K, which is also distributed, must internally (exponentially) stabilize the system and minimize a certain norm of the closed loop map $T_{zw}$. As will be shown in more generality in Section 5.1, no performance loss occurs by restricting he design to controllers which are themselves space/time invariant. Under these circumstances, the closed loop $H:=T_{zw}$ is a space/time invariant system, which can be represented by the convolution.

$$z(x,t)=\int_G\int_0^\infty h(\zeta,\tau)w(x-\zeta,t-\tau)d\zeta d\tau \qquad (21)$$

(in the continuous time case) or the transfer function representation $$\hat{z}(\lambda,s)=\hat{H}(\lambda,s)\hat{w}(\lambda,s) \qquad (22)$$

The stabilizing property of K is required to guarantee (21), (22) are meaningful under suitable signal classes. For our purposes, we will require that $\hat{H}(\lambda,s)$ be bounded, and analytic in the second variable over $\hat{G}\times\{Re(s)>0\}$.

This in particular, implies that H is a well defined operator on $L_2(G\times R)$, with induced norm $$\|H\|_{L_2\to L_2}=\|H\|_\infty:=\sup_{\lambda\in\hat{G},w\in R}\bar{\sigma}(\hat{H}(\lambda,j\omega)) \qquad (23)$$

which we call the $H_\infty$ norm of the system; note, however, that the Hardy space (analytic) structure refers only to the second variable; from the point of view of the spatial frequency this is only an $L_\infty$ norm. Thus, the $H_\infty$ control problem in this context is to find a stabilizing K which minimizes the above quantity.

Another system specification which translates naturally to the frequency domain is the $H_2$ criterion which characterizes the system response to white noise. For a brief motivation, consider the case of discrete time and space variables, and write the convolution expression $$z(x,t)=\sum_{\zeta\in G}\sum_{\tau=0}^\infty h(\zeta,\tau)w(x-\zeta,t-\tau) \qquad (24)$$

Now assume that $\{w(x,t)\}$ is a two-index field of independent, identically distributed random vectors, of zero mean and unit covariance. If we allow the index t to vary over the integers Z (i.e. include noise for negative time), then the variance of $\{z(x,t)\}$ is stationary[1] and given by $$E|z(x,t)|^2=\sum_{\zeta\in G}\sum_0^\infty trace(h(\zeta,\tau)^*h(\zeta,\tau))=:\|H\|_2^2, \qquad (25)$$

which is the $H_2$ system norm, and also has the frequency domain expression $$\|H\|_2^2=\frac{1}{2\pi}\int_{\hat{G}}\int_0^{2\pi} trace(\hat{H}(\lambda,e^{j\omega})^*\hat{H}(\lambda,e^{j\omega}))d\lambda d\omega \qquad (26)$$

Once again, we remark that the Hardy space structure is with respect to the temporal-frequency variables alone.

[1]When working with positive time index, we must consider the asymptotic variance.

A similar motivation can be given in the continuous time or continuous space cases, with the technical complication that now (21) must be replaced by a stochastic integral with respect to a multi-dimensional Brownian motion indexed in x and/or t; we omit the details.

The prior art on distributed parameter systems has in fact addressed versions of $H_2$ and $H_{2\delta}$ optimal control for general distributed systems; the resulting conditions are in terms of operator equations. Once again, however, if we bring the special structure of spatially invariant problems, we can exploit the frequency domain to obtain a substantial simplification in the solution.

Consider the following state-space description of the plant G in FIG. 3, where $A, B_1, B_2, C_1, C_2, D_{21}, D_{12}$ are translation invariant operators:

$$\frac{\partial}{\partial t}\psi(x,t) = A\psi(x,t) + B_1 w(x,t) + B_2 u(x,t) \tag{27}$$

$$z(x,t) = C_1\psi(x,t) + D_{12}u(x,t) \tag{28}$$

$$y(x,t) = C_2\psi(x,t) + D_{21}w(x,t), \tag{29}$$

where we have used operator notation in the spatial variables.

For simplicity, we have not included feed-through operators $D_{11}$ and $D_{22}$. It is assumed that $(A,B_2)$ and $A^*,C^*_2)$ are exponentially stabilizable, which is necessary for there to exist a stabilizing feedback. Note that these conditions can be tested by a parameterized family of finite dimensional stabilizability checks as in therorem 3. Problem Statements: We consider two different problems. They are to find controllers of the form.

$$\frac{\partial}{\partial t}\psi_K(x,t) = A_K\psi_K(x,t) + B_K y(.,t) \tag{30}$$

$$u(x,t) = C_K\psi_K(x,t) + D_K y(x,t), \tag{31}$$

where the state is a real separable Hilbert space, and $A_K$ is the generator of a $C_o$ semigroup. We demand that the closed loop system be exponently stable, and
$\|T_{zw}\|_2$ is minimized. ($H_2$ control)
The controller is $H_\infty$ admissible, that is $\|T_{zw}\|_\infty < 1$ (the general case follows by scaling).

These problems have been addressed in the prior artfor general classes of distributed parameter systems. The solutions generally available are in terms of the solvability of two operator algebraic Riccati equations (ARE's). As we now show, spatial invariance allows us to solve these operator ARE's as a parameterized family of matrix ARE's. We also discover that both the optimal $H_2$ and the central $H_\infty$ controller are spatially invariant. This is a special case of a general invariance principle that we prove in a later section for general norm robust control problems.

The block-diagonalized, Fourier transform version of (27-29) is $$\frac{d}{dt}\hat\psi(\lambda,t) = \hat A(\lambda)\hat\psi(\lambda,t) + \hat B_1(\lambda)\hat w(\lambda,t) + \hat B_2(\lambda)\hat u(\lambda,t) \tag{32}$$

$$\hat z(\lambda,t) = \hat C_1(\lambda)\hat\psi(\lambda,t) + \hat D_{12}(\lambda)\hat u(\lambda,t) \tag{33}$$

$$\hat y(\lambda,t) = \hat C_2(\lambda)\hat\psi(\lambda,t) + \hat D_{21}(\lambda)\hat w(\lambda,t) \tag{34}$$

The system is thus reduced to a parameterized family of the finite dimensional LTI systems over $\lambda \in \hat G$. New for both the $H_2$ and $H_\infty$ problems, the optimization can be decoupled over frequency since quadratic performance measures are preserved by Fourier transformation:
From (26), the distributed $H_2$ problem amounts to solving a family of standard $H_2$ problems over $\lambda$, then integrating for the overall cost.
The $H_\infty$ feasibility question $\|T_{zw}\|_\infty < 1$ can be imposed as a family of standard $H_\infty$ conditions $\|T_{zw}(\lambda,\cdot)\|\infty<1$
This means that the standard finite dimensional theory can apply at every $\lambda$. In particular, in addition to the stabilizability and detectability assumptions, we impose the following regularity conditions uniformly over $\lambda$ $$1:\ \sigma_{\min}\begin{bmatrix}\hat A(\lambda)-j\omega I & \hat B_2(\lambda)\\ \hat C_1(\lambda) & \hat D_{12}(\lambda)\end{bmatrix}\geq \epsilon>0\ \forall \lambda,\omega \tag{35}$$

$$2:\ \hat D_{12}(\lambda)^*\hat D_{12}(\lambda)>\epsilon I>0\ \forall \lambda \tag{36}$$

$$3:\ \sigma_{\min}\begin{bmatrix}\hat A(\lambda)-j\omega I & \hat B_1(\lambda)\\ \hat C_2(\lambda) & \hat D_{21}(\lambda)\end{bmatrix}\geq \epsilon>0\ \forall \lambda,\omega \tag{37}$$

$$4:\ \hat D_{21}(\lambda)\hat D_{21}^*(\lambda)>\epsilon I>0\ \forall \lambda,\omega \tag{38}$$

$$5:\ (A,B_2)\text{ and }(A^*,C_2^*)\text{ are stabilizable} \tag{39}$$

To simplify the resulting equations, without loss of generality we also assume the standard normalizations:

$$\forall \lambda \in \hat G,\ \hat D^*_{12}(\lambda)[\hat C_1(\lambda)\hat D_{12}(\lambda)]=[0 I],\ \hat D_{21}(\lambda)[\hat B^*_1(\lambda)]=[0 I]. \tag{40}$$

Under these conditions, it follows that the $H_2$ and $H_\infty$ control problems can be solved by a pair of Riccati equations over $\lambda$. To state these results precisely, we will use the following standard notation. Given matrices A,R,Q, we say that the matrix $$H=\begin{bmatrix}A & R\\ -Q & -A^*\end{bmatrix}\in dom(Ric),$$

if it has no eigenvalues on the imaginary axis and the complementary property. In this case, we use X=Ric(H), to denote the unique solution of the ARE $$A^*X+XA+XRX+Q=0,$$

such that A+RX is stable.

The solution of $H_2$ problem can now be stated in terms of a parameterized family of finite-dimensional $H_2$ problems, with an additional condition on the boundedness of the resulting solutions of parameterized ARE's. p Theorem 6 ($H_2$ design) If assumptions (35-40) are satisfied, then the matrix-valued functions $\hat P_1(\lambda):=Ric(H_1(\lambda))$, $\hat P_2(\lambda):=Ric(H_2(\lambda))$, where $$H_1(\lambda):=\begin{bmatrix}\hat A(\lambda) & -\hat B_2(\lambda)\hat B_2^*(\lambda)\\ -\hat C_1^*(\lambda)\hat C_1(\lambda) & -\hat A^*(\lambda)\end{bmatrix},$$

$$H_2(\lambda):=\begin{bmatrix}\hat A^*(\lambda) & -\hat C_2^*(\lambda)\hat C_2(\lambda)\\ -\hat B_1(\lambda)\hat B_1^*(\lambda) & -\hat A(\lambda)\end{bmatrix},$$

are bounded, i.e. $\sup_{\lambda \in \hat G}\|\hat P_i(\lambda)\|<\infty$, i=1,2.
Moreover, the unique optimal $H_2$ controller is $$K_{opt}=\left[\begin{array}{c|c}A-B_2B_2^*P_1-P_2C_2^*C_2 & P_2C_2^*\\ \hline -B_2^*P_1 & 0\end{array}\right],$$

where $P_1,P_2$ are the translation-invariant operators whose Fourier representations are $\{\hat P_1(\lambda)\}$, $\{\hat P_2(\lambda)\}$.

For the $H_{2S}$ problem, the following statement is the specialization of the main result of to the spatially invariant setting.

Theorem 7 ($H_{2S}$ design) If assumptions (35-40) are satisfied, then there exists an admissible controller if and only if the following two conditions are satisfied:

1. For all $\lambda \in \hat{G}$, the matrix $$H_1(\lambda) = \begin{bmatrix} \hat{A}(\lambda) & (\hat{B}_1(\lambda)\hat{B}_1^*(\lambda) - \hat{B}_2(\lambda)\hat{B}_2^*(\lambda)) \\ -\hat{C}_1^*(\lambda)\hat{C}_1(\lambda) & -\hat{A}^*(\lambda) \end{bmatrix} \in dom(Ric),$$

and the solution $\hat{P}_1(\lambda) := Ric(H_1(\lambda))$ is bounded, i.e. $\sup_{\lambda \in \hat{G}} \|\hat{P}_1(\lambda)\| < \infty$.

2. For all $\lambda \in \hat{G}$, the matrix $$H_2(\lambda) = \begin{bmatrix} \hat{A}^*(\lambda) & (\hat{C}_1^*(\lambda)\hat{C}_1(\lambda) - \hat{C}_2^*(\lambda)\hat{C}_2(\lambda)) \\ -\hat{B}_1(\lambda)\hat{B}_1^*(\lambda) & -\hat{A}(\lambda) \end{bmatrix} \in dom(Ric),$$

and the solution $\hat{P}_2(\lambda) := Ric(H_2(\lambda))$ is bounded, i.e. $\sup \lambda \in \hat{G} \|\hat{P}_2(\lambda)\| < \infty$.

3.

$$\sup \rho(\hat{P}_1(\lambda)\hat{P}_2(\lambda)) < 1 \lambda \in \hat{G}$$

where $\rho(\cdot)$ denotes spectral radius.

In this case, one such controller is given by $$\tilde{K} = \left[ \begin{array}{c|c} A + (B_1 B_1^* - B_2 B_2^*) P_1 - Z P_2 C_2^* C_2 & Z P_2 C_2^* \\ \hline -B_2^* P_1 & 0 \end{array} \right]$$

where $P_1, P_2$ are the translation-invariant operators whose Fourier representations are $\{\hat{P}_1(\lambda)\}$, $\{\hat{P}2(\lambda)\}$, and $Z = (I - P_2 P_1)^{-1}$.

Remarks:

It is not difficult to show that if auxiliary variables $P_1, P_2$ are positive, spatially invariant operators, the operators spectral radius is $$\rho(P_1 P_2) = \sup_{\lambda \in \hat{G}} \rho(\hat{P}_1(\lambda)\hat{P}_2(\lambda)),$$

hence the third condition in the theorem guarantees that Z is well-defined

Analogously to the finite-dimensional case and to the general operator case studied in, all $H_{2s}$-admissible controllers can be parameterized in terms of the above "central" controller.

The above two results are a specialization of well known results for certain classes of infinite-dimensional systems for the special class of spatially invariant problems. We make use of the fact that the solutions of the corresponding operator ARE's are necessarily translation invariant operators, and we state the result for their Fourier representations. This can be provided in a manner similar to the proof of theorem 5, where the ARE solutions are operators representing translation invariant quadratic forms which are value functions for certain translation invariant quadratic optimal control or differential games problems. We omit the arguments here for brevity. In a later section (sec. 5.1), we prove a general theorem on the spatial invariance of optimal controllers which generalizes the above results for a large class of robust control problems.

4 The Structure of Quadratically Optimal Controllers

The optimal controllers obtained in Section 3 have the following attractive properties:

The provide global performance guarantees. In particular, they will ensure overall stability.

They can be effectively computed by a family of low dimensional problems across spatial frequency.

However we have not considered the issue of a implementation of the control algorithm. In this regard, rather than a highly complex centralized controller with information from all the distributed array, it would be desirable to have distributed intelligence, where each actuator runs a local algorithm with information from the neighboring sensors. In this section we analyze the optimal schemes from this perspective. Relevant questions are:

(Section 4.1) Does the control law lend itself to a distributed architecture?

(Section 4.2) To what degree is information from far away sensors required? Notice that this pertains to approximate diagonalization in the original spatial variables.

4.1 Local Controller Architecture

We now illustrate the surprisingly intuitive and appealing architecture of quadratically optimal controllers (by this we mean the LQR, $H_2$ and $H_\infty$ "central" controller).

First note that the since the ARE solutions for all three problems are translation-invariant operators, then their controllers are spatially-invariant systems; in particular, the same algorithm must be run at each actuator location, the influence of each sensor depending on its position relative to the actuator.

To understand the structure of this algorithm, let us examine more closely the optimal $H_2$ controller; it has the following realization:

$$\frac{\partial}{\partial t} \psi_K(x, t) = A \psi_K(x, t) + B_2 u(x, t) + L(C_2 \psi(x, t) - C_2 \psi_K(x, t)) \quad (41)$$

$$u(x, t) = F \psi_K(x, t), \quad (42)$$

where the state feedback and estimator "gains" are $F := -B_2^* P_1 = P_2 C_2^*$.

Equation 41 can be referred to as a state estimator which includes an operator L that acts on estimation error through convolution with respect to a spatial variable to generate a state estimate. Equation 42 can be referred to as a control output generator which applies a control operator F to the state estimate through convolution with respect to the spatial variable. Both L and F can be derived from auxiliary variables $P_1$ and $P_2$. Equations 41 and 42 define the controller architecture, and precisely describe the controller dynamics.

The above implies the following structure of the optimal controller:

(a) A distributed estimator whose local state is $\psi_K(x,t)$. Note that to propagate this state (eq. (41)), one needs to know the outputs of neighboring estimators, and convolve the prediction errors with the kernel of L (the size of this neighborhood is determined by the spread of L). We note that at a given $X_o \in G_1$ the local controller state $\psi_K(x_o, t)$ has a physical interpretation; it is the estimate of the system's local state $\psi(x_o, t)$.

(b) The feedback at position x is given by u(x,t) which is computed by convolving neighboring state estimates with the kernel of F (the size of his neighborhood is determined by the spread of F).

Thus the optimal laws are directly amenable to a distributed implementation, with localized actuation and information passing. What determines the degree of localization, and thus the communication burden for the array, is the spread of the convolution operators L and F. Note that the system operators $B_2$ and $C_2$ are typically PDE operators, therefore localized. However in general the Riccati solutions $P_1$ and $P_2$ will not be differential operators ($\hat{P}_1(\lambda)$ and $\hat{P}_2(\lambda)$ are not rational in general, see the example in Section 4.2), and their convolution kernels will have a spread, reflecting the need of information passing within the array.

In the next subsection we will provide means of evaluating the spread of the auxiliary variables $P_1$, $P_2$; in particular we will see that these convolution kernels decay exponentially in space; thus the optimal control laws have an inherent degree of decentralization. From a practical perspective, the convolution kernels can be truncated to form "local" convolution kernel that have performance close to the optimal, and preserve the appealing architecture described above.

4.2 The Degree of Spatial Localization

We will study the localization issue for systems with unbounded spatial domains; for these we can ask the question of how the controller gains decay as we move away in space. For concreteness focus on the case G=R (and Ĝ=R), analogous ideas apply to the discrete case G=Z. We first consider an example of LQR optimization.

EXAMPLE

Consider the heat equation on an infinite bar (system model) with distributed heat injection $$\frac{\partial}{\partial t}\psi(x, t) = c\frac{\partial^2}{\partial x^2}\psi(x, t) + u(x, t) \tag{43}$$

Here the group G is the real line. The standard Fourier transform yields the transformed system $$\frac{d}{dt}\hat{\psi}(j\lambda, t) = -c\lambda^2\hat{\psi}(j\lambda, t) + \hat{u}(j\lambda, t) \tag{44}$$

Note that we are writing the Fourier transform as a function on the imaginary axis $jR$; this system-theoretic notation will be useful when considering analytic continuation issues below.

Taking for example Q=qI (multiple of the identity) and R=I in the LQR cost (18), the corresponding (scalar) parameterized Riccati equation is $$-2c\lambda^2\hat{p}(j\lambda) - \hat{p}(j\lambda)^2 + q = 0 \tag{45}$$

which has a positive solution $$\hat{p}(j\lambda) = -c\lambda^2 + \sqrt{c^2\lambda^4 + q}. \tag{46}$$

An inverse Fourier transform would yield the convolution kernel $k(x) = -p(x)$ of the optimal state feedback $u = K\psi$. Note that even though the system and the cost are rational in $\lambda$, the optimal control is irrational. This in particular implies that it cannot be implemented by a "completely localized" PDE in x and t, but is must look at distant points to compute a spatial convolution, $$u(x,t) = \int_R k(x-\zeta)\psi(\zeta)d\zeta.$$

Figure 4:
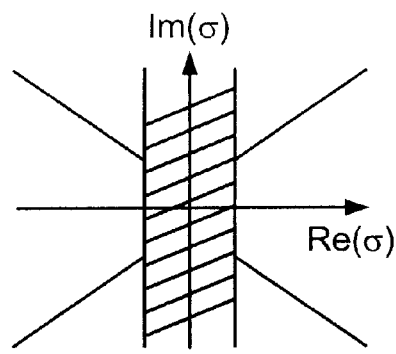
FIG. 4 illustrates an analytic region of an auxiliary variable used in calculations in accordance with the present invention.

Thus the spatial decentralization question is directly related to the decay react of p(x) as a function of x. It turns out that this can be studied by analytic continuation of the Fourier transform $\hat{p}(j\lambda)$ into the complex plane. In particular, $\hat{p}(j\lambda)$ can be extended to the function $$\hat{p}(\sigma) = c\sigma^2 + \sqrt{c^2\sigma^4 + q}$$

of $\sigma \in C$, which is analytic in a region of the complex plane which avoids the four branch cuts shown by the diagonal lines in FIG. 4 which illustrates an analytic continuation region for $\hat{p}(j\lambda) = -c\lambda^2 + \sqrt{c^2\lambda^4 + q}$. Thus, the Fourier transform of $\hat{p}$ can be analytically extended to the strip $$\left\{\sigma \in C : |\text{Re}(\sigma)| < \frac{\sqrt{2}}{2}\left(\frac{q}{c^2}\right)^{\frac{1}{4}}\right\}.$$

Now, a consequence of the Paley-Wiener theorem is that $p(x)$ must decay exponentially, i.e. there exists M>0 such that $$|k(x)| \leq Me^{-\alpha|x|}, \text{ for any } \alpha < \frac{\sqrt{2}}{2}\left(\frac{q}{c^2}\right)^{\frac{1}{4}}.$$

Since $\{k(x)\}$ decays exponentially with $|x|$, it can be truncated to form a "localized" feedback convolution operator whose closed loop performance is close to the optimal. We note that in this particular problem, and interesting tradeoff seems to be in place: in the limit of "cheap" control (i.e. $q \to \infty$) the analyticity region grows and the controller becomes more decentralized. It seems thus possible that there is an inherent tradeoff between actuator authority and controller decentralization.

4.2.1 Analytic Continuation of Riccati Equation Solutions

In this section we will generalize the method of the example to study the exponential decay of convolution kernels which describe the Riccati solution P for spatially invariant optimal control problems. Once again, the key idea is to provide an analytic continuation for the Fourier description $\hat{P}(j\lambda)$ around the imaginary axis. We focus on the LQR Riccati equation (20), and for simplicity set R=I.

The first step is to write analytic extensions of the functions $\hat{A}(j\lambda)$, $\hat{B}(j\lambda)$, $\hat{Q}(j\lambda)$ around the imaginary axis. This amounts to taking Laplace (rather than Fourier) transforms on the operators A,B,Q, and applies in particular to differential operator which arise in PDE models.

We adopt the notation $B\sim(\sigma) := B^T(-\sigma)$, and make the following assumptions:

1. The Laplace transforms $A(\sigma)$, $B(\sigma)$ are rational functions analytic on a strip $S = \{|\text{Re}(\sigma)| < \alpha\}$.
2. For every $\sigma \in S$, $(A(\sigma)B\sim(\sigma))$ is stabilizable.
3. For every $\sigma \in S$, if for some vectors $y, z \in C^n$, $z^T B(\sigma) B\sim(\sigma) y = 0$, then either $z^T B(\sigma) = 0$, or $B^T(-\sigma) y = 0$ (or both). In other words, the range space of $B^T(\sigma)$ does not contain vectors orthogonal to those in the range space of $B^T(-\sigma)$.

This last assumption is satisfied for example when $B(\sigma)$ is either a scalar or a vector. Under these assumptions, we will show that the ARE solution $\hat{P}(j\lambda)$ admits an analytic continuation to a strip around the imaginary axis (possibly smaller than S), hence the spatial convolution kernel decays exponentially. In addition, we well study means of computing the corresponding strip and decay bound. We remark here that these assumptions are perhaps not the most general under which an analytic extension can be found, but we impose them here for simplicity.

Define the following generalized Hamiltonian matrix:

$$H(\sigma) = \begin{bmatrix} A(\sigma) & -B(\sigma)B\sim(\sigma) \\ -Q(\sigma) & -A\sim(\sigma) \end{bmatrix}. \tag{47}$$

$H(\sigma)$ is analytic on $\sigma \in S$; restricted to the $j\lambda$ axis it is the Hamiltonian matrix which corresponds to the ARE (20). Hence its stabilizing solution $P(j\lambda)$ is associated with the stable invariant subspace of $H(j\lambda)$; to extend $P(j\lambda)$ analytically amounts to extending this subspace. We note that for $\sigma \neq j\lambda$ we still use the notation $H(\sigma) \in \text{dom}(\text{Ric})$ to mean that it has no purely imaginary eigenvalues and a stable eigensubspace complementary to the range of $[0 I]^T$. In such case we denote the unique stabilizing (not necessarily Hermitian) solution by $\text{Ric}(H(\sigma))$ (see the appendix).

The precise statement of analytic extension follows.

Theorem 8 Given the above assumptions and H as in (47), with $H(j\lambda) \in \text{dom}(\text{Ric})$ $\forall \lambda \in R$:

1. If for some $\beta > 0$, such that $\beta < \alpha$ and the following condition $$\forall \omega \in R, |\text{Re}(\sigma)| < \beta, \det(j\omega I - H(\sigma)) \neq 0, \quad (48)$$

holds, we can conclude that in the strip $\{|\text{Re}(\sigma) < \beta|\}$, $H(\sigma) \in \text{dom}(\text{Ric})$, and $P(\sigma) := \text{Ric}(H(\sigma))$ is an analytic extension of $\hat{P}(j\lambda)$.

2. There exists a $\beta > 0$ such that the condition (48) is satisfied.

Part 1. The condition (48) guarantees that no eigenvalue of $H(\sigma)$ crosses the imaginary axis as $\sigma$ varies in the strip $\{|\text{Re}(\sigma) < \beta|\}$. Since $H(\sigma) \in \text{dom}(\text{Ric})$ for $\sigma = j\lambda$, we conclude that for any $\sigma$ in the strip, $H(\sigma)$ has exactly $\eta$ stable and $\eta$ anti-stable eigenvalues. We note here that $H(\sigma)$ no longer has the standard Hamiltonian structure for $\sigma \neq j\lambda$, however, our assumptions guarantee that it has a stabilizing solution (no longer necessarily Hermitian) with the property that $P(\sigma) = P^T(-\sigma)$ (we refer the reader to the appendix for the details of this argument).

It remains to show that the solution $P(\sigma)$ is analytic in the strip. To see this, note that $P(\sigma)$ is the stabilizing solution of the ARE $$A^\sim(\sigma)P(\sigma) + P(\sigma)A(\sigma) - P(\sigma)B(\sigma)B^\sim(\sigma)P(\sigma) + Q(\sigma) = 0.$$

Differentiating this equation with respect to $\bar{\sigma}$ (the complex conjugate of $\sigma$), we obtain:

$$\frac{\partial A^\sim}{\partial \bar{\sigma}}P + A^\sim \frac{\partial P}{\partial \bar{\sigma}} + \frac{\partial P}{\partial \bar{\sigma}}A + P\frac{\partial A}{\partial \bar{\sigma}} - \frac{\partial P}{\partial \bar{\sigma}}BB^\sim P -$$

$$P\frac{\partial B}{\partial \bar{\sigma}}B^\sim P - PB\frac{\partial B^\sim}{\partial \bar{\sigma}}P - PBB^\sim \frac{\partial P}{\partial \bar{\sigma}} + \frac{\partial Q}{\partial \bar{\sigma}} = 0.$$

Using the analyticity of A,B,Q, this equation reduces to $$(A^\sim - PBB^\sim)\frac{\partial P}{\partial \bar{\sigma}} + \frac{\partial P}{\partial \bar{\sigma}}(A - BB^\sim P) = 0,$$

which is a Sylvester equation. Since $(A - BB^\sim P)$ and $(A^\sim - PBB^\sim)$ are both stable for $\{|\text{Re}(\sigma) < \beta|\}$, then we have that $$\frac{\partial P}{\partial \bar{\sigma}} = 0$$

in that strip, i.e. P is analytic there. Part 2. Let us write $\sigma := \epsilon + j\lambda$. Then (48) can be rewritten as $$\forall \epsilon \in [-\beta, \beta], \lambda, \omega \in R, \det(j\omega I - H(\epsilon + j\lambda)) \neq 0 \Leftrightarrow q(\omega, \lambda, \epsilon) \neq 0, \quad (49)$$

where q is some polynomial in the real variable $\omega, \lambda, \epsilon$ (since $H(\sigma)$ is rational). The hypothesis imply that (49) is true at $\epsilon = 0$. We want to show that this is also true for $\epsilon \in [-\beta, \beta]$ for some $\beta > 0$. To do this, we appeal to the Tarski-Seidenberg quantifier elimination procedures, where we can obtain the following equivalence $$\forall \lambda, \omega \in R, q(\omega, \lambda, \epsilon) \neq 0 \Leftrightarrow \tilde{q}1(\epsilon) > 0, \ldots, \tilde{q}n(\epsilon) > 0,$$

for some $\eta$ polynomials $\{\tilde{q}i\}$. Clearly, if this last condition is satisfied at $\epsilon = 0$, it is satisfied in some non-zero interval $[-\beta, \beta]$.

The difficulty in establishing the existence of a solution $P(\sigma)$ for $\sigma \neq j\lambda$ is that the corresponding ARE is not standard, in that the coefficients $-B(\sigma)B^\sim(\sigma)$, $Q(\sigma)$ are not Hermitian or even symmetric. However, the "Hamiltonian" does have the property $J^{-1}H(\sigma)J = -H^\sim(\sigma)$, which as we will see, implies that the solution has the property $P^\sim(\sigma) = P(\sigma)$.

We first find bases for the stable eigenspaces of $H(\sigma)$ and $H^\sim(\sigma)$ such that $$H(\sigma)\begin{bmatrix} X_1(\sigma) \\ X_2(\sigma) \end{bmatrix} = \begin{bmatrix} X_1(\sigma) \\ X_2(\sigma) \end{bmatrix} H_-(\sigma) \quad (50)$$

$$[X_1^T(-\sigma) X_2^T(-\sigma)]H^T(-\sigma) = H_-^T(-\sigma)[X_1^T(-\sigma) X_2^T(-\sigma)],$$

where $H_-(\sigma)$ and $H_-^T(-\sigma)$ are stable matrices. Note that the matrices $X_i(\sigma)$ and $X_i(-\sigma)$ are not necessarily related, but we now derive some relations. Using the stability of $H_-(\sigma)$ and $H_-^T(-\sigma)$, we conclude that $$X_1^T(-\sigma)X_2(\sigma) = X_2^T(-\sigma)X_1(\sigma). \quad (51)$$

This relation also implies that $$X_1(\sigma) \text{ is invertible} \Leftrightarrow X_1^T(-\sigma) \text{ is invertible}.$$

To see that, assume that $X_1(\sigma)$ is invertible and $X_1^T(-\sigma)$ is not. This means $\exists z \in C^n$ such that $z^T X_1^T(-\sigma) = 0$, but then eq. (51) implies that $z^T X_2^T(-\sigma) X_1(\sigma) = 0$, which in turn implies that $z^T X_2^T(-\sigma) = 0$ (since $X_1(\sigma)$ is invertible) which contradicts the fact that $[X_1^T(-\sigma) \ X_2^T(-\sigma)]$ forms a basis.

The above two facts imply that whenever $X_1(\sigma)$ is invertible $$P(\sigma) := X_2(\sigma)X_1^{-1}(\sigma) = (X_2(-\sigma)X_1^{-1}(-\sigma))^T$$

is well defined and has the property $P^\sim(\sigma) = P(\sigma)$ (this is the counterpart of the Hermitian property for this nonstandard ARE).

We are now ready to prove that our assumptions guarantee that $X_1(\sigma)$ is invertible. Suppose it is not, then we firs have Claim: Either $\ker(X_1(\sigma))$ is $H_-(\sigma)$ invariant, or $\ker(X_1(-\sigma))$ is $H_-(-\sigma)$ invariant. Proof: Suppose not, then $\exists y, z \in C^n$ such that $z^T X_1^T(-\sigma) = 0$ & $z^T H_-^T(-\sigma)X_1^T \neq 0$, and $X_1(\sigma)y = 0$ & $X_1(\sigma)H_-(\sigma)y \neq 0$. Now, the first component of equation (50) is $$A(\sigma)X_1(\sigma) - B(\sigma)B^\sim(\sigma)X_2(\sigma) = X_1(\sigma) = X_1(\sigma)H_-(\sigma), \quad (52)$$

which then gives $$-z^T X_2^T(-\sigma)B(\sigma)B^T(-\sigma)X_2(\sigma)y = z^T X_2^T(-\sigma)X_1(\sigma)H_-(\sigma)y = z^T X_1^T(-\sigma)X_2(\sigma)H_-(\sigma)y = 0,$$

which by our assumption imply that either $z^T X_2^T(-\sigma)B(\sigma) = 0$ or $B^T(-\sigma)X_2(\sigma)y = 0$ (or both). This last statement, together with eq. (52) and its "dual" imply:

$$B^T(-\sigma)X_2(\sigma)Y = 0 \Rightarrow X_1(\sigma)H_-(\sigma)y = 0$$
$$z^T X_2^T(-\sigma)B(\sigma) = 0 \Rightarrow z^T H_-^T(-\sigma)X_1^T(\sigma) = 0.$$

Since at least one of the above is true, we have a contradiction, and the claim is proved.

We will assume the first clause of the claim and show that the stabilizability assumption is then violated, a symmetrical argument can be made if the second clause is true.

Since $\ker(X_1(\sigma))$ is $H_-(\sigma)$ invariant, $\exists v \in \ker(X_1(\sigma))$ such that $H_-(\sigma)v = \lambda v$, with $\text{Re}(\lambda) < 0$.

Multiplying equation (50) by v, we obtain $$\begin{bmatrix} -B(\sigma)B^\sim(\sigma) \\ -A^T(-\sigma) \end{bmatrix} X_2(\sigma)v = \begin{bmatrix} 0 \\ \lambda X_2(\sigma)v \end{bmatrix} \Rightarrow \begin{bmatrix} -B(\sigma)B^\sim(\sigma) \\ -A^T(-\sigma) - \lambda I \end{bmatrix} X_2(\sigma)v = 0,$$

which violates the stabilizability assumption (at $-\sigma$), since $X_2(\sigma)v$ is a non-zero vector (because $S_1, X_2$ form a basis), and $RE(-\lambda)>0$.

We have thus established the existence of a solution with the property that $P^\sim(\sigma)=P(\sigma)$. This solution give a stable $A(\sigma)-B(\sigma)B^\sim(\sigma)P(\sigma)$ by a standard argument.

We have shown that under appropriate assumptions, optimal controllers will have an exponential decay rate in the spatial coordinate. Comparing this with the decay of the Fourier transform, which is rational in $\lambda$, we see that at least in qualitative sense, the spatial domain is more appropriate to perform truncations that the Fourier domain. This is an important comment, because a commonly used method for controller design in distributed parameter systems is to "pick a number of modes", i.e. truncate in the Fourier domain. This "modal truncation" ignores the inherent localization of the controller in the spatial coordinates.

4.2.2 A Computational Test for the Decay Rate

The determinant condition in theorem 8 can be efficiently tested by a technique similar to those used in structured singular value theory. We again consider the special case where $H(\sigma)$ is a rational function, then we can write the "descriptor realization"

$$H(\sigma)=D_H+C_H(\sigma E-A_H)^{-1}B_H, \tag{53}$$

well defined over S, and reduce the condition (48) to $$det\begin{bmatrix} \sigma E - A_H & B_H \\ C_H & j\omega I - D_H \end{bmatrix} \neq 0, \forall \omega \in \mathbb{R}, |Re(\sigma)| < \beta. \tag{54}$$

This procedure casts the Hamiltonian condition for $\beta$ as a well-posedness condition, of an analogous nature to the structured singular value theory, the main difference being the domains in which these conditions must be imposed.

With this inspiration, we can "close the other loop" and define $$M(j\omega):=A_H+B_H(j\omega I-D_H)^{-1}C_H$$

which leads to the equivalent condition $$det(\sigma E-M(j\omega))\neq 0, \omega \in R, |Re(\sigma)|<\beta. \tag{55}$$

Note that conditions (53) and (55) are exactly the condition (54) written in terms of the Schur complements.

Equivalently, we conclude that $\beta$ satisfies (48) if and only if $$\inf_{\omega \in R} |Re[eig(E, M(j\omega))]| \geq \beta. \tag{56}$$

This last condition involves only a generalized eigenvalue computation plus a one dimensional search over the parameter $\omega$; in general, we can plot the eigenvalue condition over a grid of frequencies, and from the estimate a suitable value of $\mu$.

Invoking Theorem 8 and the Paley-Wiener Theorem, a $\beta$ satisfying (56) bounds the exponential decay of the optimal convolution kernel P(I).

5 Partially Actuated Systems: Extensions and Limitations

The main assumption in our work thus far has been that the system is fully actuated, i.e. that the controls and states are defined over the same index set G. More precisely, we assumed that $dim\{\Psi\}/G\}$, $dim\{U/G\}$, $dim\{Y/G\}$, are all finite. In this section we first show how for systems in which $dim\{\Psi/U\}$ is infinite, our techniques still provide some reduction in the complexity of the control design problem. We then prove a general result value for non-quadratic performance measure, that optimal controllers are spatially invariant if the system is.

$$\frac{\partial}{\partial t}\psi(x, \xi, t) = A\psi(x, \xi, t) + Bu(x, t) \tag{57}$$

$$y(x, t) = C\psi(x, \xi, t) + Du(x, t), \tag{58}$$

with $I \in G$ a group, and $\xi \in S$ a set of indices with no a priori defined structure. We now demand that the operators A, B, C, D commute only with translations $T_I$, for $I \in G$.

A more general and abstrate model would be to simply regard the state as taking values in an infinite-dimensional space for every $I \in G$ (this amounts to "suppressing" the variable $\xi$). We can then write the model as previously, $$\frac{\partial}{\partial t}\psi(x, t) = A\psi(x, t) + Bu(x, t)$$

$$y(x, t) = C\psi(x, t) + Du(x, t),$$

where now for every $I \in G$ the system is infinite-dimensional with finite-dimensional inputs and outputs.

The techniques we have presented for fully actuated systems can now be applied to yield parameterized families of control problems involving infinite-dimensional systems. To solve each such problem, one must resort to some approximation technique. However, our development implies that one needs to approximate only in the dimensions in which the problem is not spatially invariant.

We now briefly present two examples to illustrate this point.

Material with an Array of Heaters and Sensors

Consider the system in FIG. 5 which illustrates a material with arrays of heaters and sensors. The signals $\{u_i\}$ are heating commands, and $\{y_i\}$ are heat sensor measurements. We assume the heat distribution to be governed by the one dimensional heat equation. The controls and measurements interact with the heat equation via appropriate "influence" functions.

If we divide the system into an array of "cells" as shown, the spatial invariance of the system with respect to the index $i \in Z$ is obvious (assuming the underlying PDE to have constant coefficients). In this case, the state $\psi_i$ of the i'th cell is infinite dimensional, and it represents the temperature distribution inside that cell. Each $\psi_i$ interacts with its $u_i$ and $y_i$ through influence functions, and with neighboring cells through boundary conditions. If some appropriate finite-dimensional approximation for each i'th subsystem is found, we are then in the situation of the fully actuated models, with a state vector $\overline{\psi}$ that represents the approximate description of $\psi_i$.

The benefit of this point of view is that one needs to find an approximation to the infinite-dimensional problem only for each cell rather than for the whole system. The spatially invariant structure of the controller is then apparent.

Stabilization of Fluid Flow in a Channel

This is a problem that has attracted much recent attention. An example of this problem is depicted in FIG. 8, where the flow of fluid in a two dimensional channel is being controlled by blowing/suction actuators (indicated by arrows towards the channel) and an array of flow shear sensors are used as measurement outputs (indicated by arrows away from channel). The control objective in this problem is to stabilizes the nominal laminar flow. This set up is a prototype for the important problem of skin-friction drag reduction by micro actuators and sensors.

The system model for this problem can be taken to the linearized Navier-Stokes equations about the nominal flow. This model is spatially-invariant in the horizontal dimension, but not in the vertical one. As in the previous example, we can take cells consisting of thin vertical slices (each to include one pair of sensors and actuators) as the basic cells. The state $\bar{\psi}_i$ of each cell would then represent the flow field in each vertical "slice".

The realization that this problem is spatially invariant in the horizontal dimension significantly reduces the complexity of the control design. To approximate the linearized Navier-Stokes equations in both directions at large Reynolds numbers is prohibitively expensive computationally, and would yield controllers of very large orders. The horizontal spatial invariance of this problem implies that (a) one only needs to approximate in the vertical dimension, the horizontal dimension should be Fourier transformed, and (b) optimal controllers have the structure of horizontal spatial convolutions that are spatially localized (see Section 5).

5.1 A General Result on the Spatial Invariance of Optimal Controllers

In this section we divert from our $L_2$ set up and consider problems for general $L_p$ induced norms. We have seen that quadractically optimal controllers for spatially invariant systems are themselves spatially invariant. We will ask a similar question for more general $L_p$ induced norms: given a spatially-invariant generalized plant, is the optimal controller necessarily spatially invariant. Fortunately, the answer is yes, and this implies a significant reduction in the complexity of the control design problem.

To state the result precisely, consider a set up in terms of the "standard problem" of robust control. This is shown in FIG. 3 All signals w, z, u, y are vector-valued signals indexed over the same group G. The objective in this problem is to find a stabilizing controller that minimizes the $L_p(G)$-induced norm from from w to z. For reference we note here that the $L_p(G)$ norm is defined as $$\|w\|_p := (\int_G \int_R |w_I(t)|^p dt \, dx)^{1/p} = (\int_G \|w\|_p^p)^{1/p}.$$

We note that taking such norms on the regulated variables z allows us to penalize global objectives, i.e. to design the controller so that some macro-objective of the overall array system is optimized.

In the usual notation, we will refer to the closed loop system in FIG. 3 by F(G, K). For any given p, the input-output sensitivity of the system is given by the $L_p$ induced norm:

$$\|\mathcal{F}(G, K)\|_{p-i} := \sup_{w \in \mathcal{L}_p} \frac{\|z\|_p}{\|w\|_p}.$$

If the controller is a stabilizing controller the above worst case gain will be finite.

Let LSI and LSV be the classes of Linear Spatially Invariant and Linear Spatially Varying (not necessarily stable) systems respectively, let us define the following two problems:

$$\gamma_{si} := \inf_{\substack{\text{stabilizing } K \\ K \in LSI}} \|\mathcal{F}(G, K)\|_{p-i}; \quad \gamma_{sv} := \inf_{\substack{\text{stabilizing } K \\ K \in LSV}} \|\mathcal{F}(G, K)\|_{p-i},$$

which are the best achievable performances with LSI and LSV controllers respectively.

We now can state the main result of this present invention:

Theorem 9 If the generalized plant G is spatially invariant and has at least one spatially-invariant stabilizing controller, then the best achievable performance can be appreciated with a spatially-invariant controller. More precisely γsi=γsv.

Proof: We use the existence of one stabilizing controller to obtain a stable coprime factorization of the plant. Since the controller is spatially invariant, then so are the stable factors. With the Youla-Jabr-Bonjorno-Kucera (YJBK) parameterization, our problem ten becomes $$\gamma_{si} := \inf_{\substack{\text{stable } Q \\ Q \in LSI}} \|H_1 - H_2 Q H_3\|; \quad \gamma_{sv} := \inf_{\substack{\text{stable } Q \\ Q \in LSV}} \|H_1 - H_2 Q H_3\|,$$

where the stable systems $\{H_i\}$ are LSI.

We first consider the case where the group G is infinite. Let $\bar{Q}$ (Possibly LSV) achieve a given performance level $\bar{\gamma} = \|H_1 - H_2 \bar{Q} H_3\|$. Define the averaged system $$Q_{av} := \frac{1}{|G|} \sum_{\sigma \in G} T_{-\sigma} \bar{Q} T_\sigma,$$

where the "shift" operator $T_\sigma$ acts by $(T_\sigma \psi)(i) := \psi(I=94)$. Now it is clear that $Q_{av}$ is spatially invariant, since the group property guarantees for any $I \in G$ $$T_{-x} Q_{av} T_x = T_{-x} \left( \sum_{\sigma \in G} T_{-\sigma} \bar{Q} T_\sigma \right) T_x = \sum_{\sigma \in G} T_{-\sigma} \bar{Q} T_\sigma,$$

(i.e. the sum is re shuffled). Now we prove that $Q_{av}$ achieves at least the same performance as $\bar{Q}$. This is standard since $$\|H_1 - H_2 Q_{av} H_3\| =$$

$$\left\| H_1 - H_2 \left( \frac{1}{|G|} \sum_{\sigma \in G} T_{-\sigma} \bar{Q} T_\sigma \right) H_3 \right\| = \left\| \frac{1}{|G|} \sum_{\sigma \in G} T_{-\sigma} (H_1 - H_2 \bar{Q} H_3) T_\sigma \right\| \leq$$

$$\frac{1}{|G|} \sum_{\sigma \in G} \|T_{-\sigma} (H_1 - H_2 \bar{Q} H_3) T_\sigma\| = \|H_1 - H_2 \bar{Q} H_3\|,$$

where we have used the spatial invariance of the $\{H_i\}$'s and of the norm. In the case of infinite G, take a sequence of finite subsets $M_1 \subset M_2 \subset \ldots$, with $\cup_n M_n = G$, then define:

$$Q_n := \frac{1}{|M_n|} \int_{M_n} T_{-\sigma} \bar{Q} T_\sigma d\sigma,$$

where $|M_n|$ is total Haar measure of $M_n$. This sequence $Q_n$ then converges weak-* to a spatially-invariant $Q_{uv}$ with the required norm bound.

The above result implies that optimal controllers are essentially given by spatial convolutions. This is a useful fact since in many problems the spatial invariance of the plant is obvious from physical symmetry principles, and may be ascertained without writing the PDE model of the system. This could be the starting point of distributed identification based control algorithms (i.e. adaptive or "slowly" varying, etc.).

Remark: Although the examples we consider in this paper are over commutative groups, the proof of the above theorem does not require this assumption, and the statement holds for non-commutative groups as well. For example, a Multi-input multi-output transfer function matrix where the entries are invariant with respect of to a permutation subgroup of the input and output indices will have an optimal controller with the same invariance property.

We close this section by an example illustrating how the above invariance principle can be used to ascertain the architecture of optimal controllers for a system with an ineven distribution of sensors and actuators. Consider the schematic in FIG. 7A, where squares and circles denote actuators 14 and sensors 12 respectively. Assuming that such devices are interacting with a medium described by constant coefficient PDE's, what is the structure of optimal controllers?

We first note that to make use of theorem 9, we must have input and output signals defined over a common index. To do this, we group the actuators 14 and sensors 12 as shown in FIG. 7B, where each fundamental ell contains one actuator and two sensors, and thus the underlying symmetry group is $Z^2$. With this regrouping (a soft of spatial "lifting", as in the treatment of temporally periodic systems), the system's input-output relation can be written as $$\begin{bmatrix} y^1_{(i,j)} \\ y^2_{(i,j)} \end{bmatrix} = \sum_{k,l} \begin{bmatrix} P^1_{(k,l)} \\ P^2_{(k,l)} \end{bmatrix} u_{(i-k,j-l)}.$$

Now, theorem 9 states that the optimal controller is given from a two-indexed set of one by two transfer functions, i.e.

$$u_{(i,j)} = \sum_{k,l} [K^1_{(k,l)} \; K^2_{(k,l)}] \begin{bmatrix} y^1_{(i-k,j-l)} \\ y^2_{(i-k,j-l)} \end{bmatrix}.$$

6. Conclusion

The present invention is directed to control problems with distributed sensing and actuation over spatial coordinates. We have identified the spatial invariance property as a fundamental tool in understanding the complexity of optimal control design with regard to global objectives. In the special case of quadratic performance measures (LQR, $H_2$, $H_\infty$), we provided exact solutions to infinite dimensional control design problems in terms of parameterized families of finite dimensional ones. We have also discovered that these optimal controllers are inherently distributed and spatially localized. Finally, we proved a general principle that any spatial invariance of the plant is inherited by an optimal controller under a variety of performance criteria.

In terms of spatial localization, the results of Section 4.2 on exponential decay rates of the optimal convolution kernel provide a qualitative assessment. Although these results are for unbounded domains, examples involving bounded domains appear to have this inherent localization property as well.

While this invention has been particularly shown and described with references to preferred embodiments thereof, it will be understood by those skilled in the art that various changes in form an details may be made therein without departing from the spirit and scope of the invention as defined by the appended claims.

What is claimed is:

1. A control system for controlling a medium, comprising:
    a plurality of sensors spatially coupled to the medium to measure a spatial variable experienced by the medium;
    a plurality of actuators spatially coupled to the medium to affect the medium in a manner related to the spatial variable; and
    a controller coupled to the sensors and actuators to control the medium related to the spatial variable in a manner that considers the spatial relationship of the sensors and actuators to the medium, the controller including:
        a state estimator including an operator which acts on estimation error through convolution with respect to the spatial variable to generate a state estimate; and
        a control output generator which applies a control operator to the state estimate through convolution with respect to the spatial variable.

2. The system of claim 1, wherein the operator of the state estimator and the control operator are localized in space.

3. The system of claim 1, wherein the operator of the state estimator and the control operator are independent of time.

4. The system of claim 1, wherein said control system is controlling a spatially invariant system.

5. The system of claim 1, wherein the operator of the state estimator and the control operator quadratic objective functions.

6. The system of claim 1, wherein the control system is a model-based estimator control system.

7. A control system for controlling a medium, comprising:
    means for measuring a spatial variable experienced by the medium;
    means for affecting the medium in a manner related to the spatial variable; and
    means for controlling the medium related to the spatial variable in a manner that considers the spatial relationship of the means for measuring and means for affecting the spatial variable of the medium, the means for controlling the plant including:
        means for estimating a state including an operator which acts of estimation error through convolution with respect to a spatial variable to generate a state estimate; and
        means for generating a control output including applying a control operator to the state estimate through convolution with respect to the spatial variable.

8. The system of claim 7, wherein the operator of the state estimator and the control operator are localized in space.

9. The system of claim 7, wherein the operator of the state estimator and the control operator are independent of time.

10. The system of claim 7, wherein said control system is controlling a spatially invariant system.

11. The system of claim 7, wherein the operator of the state estimator and the control operator minimize quadratic objective functions.

12. The system of claim 7, wherein the control system is a model-based estimator control system.

13. A method of controlling a medium, comprising:
    providing sensors to measure a spatial variable experienced by the medium;
    providing actuators to affect the medium in a manner related to the spatial variable; and
    using the sensors and actuators, controlling the medium related to the spatial variable in a manner that considers the spatial relationship of the and actuators to the medium, the controlling including:
estimating a state of the medium including using an operator which acts on estimation error through convolution with respect to the spatial variable to generate a state estimate; and
applying a control operator to the state estimate through convolution with respect to the spatial variable.

14. The system of claim 13, wherein the operator of the state estimator and the control operator are localized in space.

15. The system of claim 13, wherein the operator of the state estimator and the control operator are independent of time.

16. The system of claim 13, wherein said control system is controlling a spatially invariant system.

17. The system of claim 13, wherein the operator of the state estimator and the control operator minimize quadratic objective functions.

18. The system of claim 13, wherein the control system is a model-based estimator control system.

19. A method of automatically designing a control system, comprising:
automatically obtaining a system model of a medium and the control system spatially coupled to the medium by sensors and actuators to measure and affect a spatial variable of the medium, respectively, in a manner that considers the spatial relationship of the sensors and actuators to the medium;
computing a transform of the system model with respect to the spatial variable;
solving linear matrix inequalities to generate auxiliary variables;
performing an inverse transform on the auxiliary variables; and
computing an estimator operator and a control operator for a model-based estimator control system.

20. The method of claim 19, wherein said step of controlling a transform of the model with respect to the spatial domain is accomplished using a Fourier transform.

21. The method of claim 19, wherein said step of solving linear matrix inequalities to generate auxiliary variables is accomplished using algebraic Ricatti equations.

22. The method of claim 19, wherein said system model is spatially invariant.

23. The method of claim 19, wherein said estimator operator acts on estimation error through convolution with respect to a spatial variable to generate a state estimate, and further comprising a control output generator which applies the control operator to the state estimate through convolution with respect to the spatial variable.

24. The method of claim 19, wherein the estimator operator and the control operator are localized in space.

25. The method of claim 19, wherein the estimator operator and the control operator are independent of time.

26. The method of claim 19, wherein the estimator operator and the control operator minimize quadratic objective functions.

27. An automatic control system designer, comprising:
means for automatically obtaining a system model of a medium and a control system spatially coupled to the medium by sensors and actuators to measure the affect a spatial variable of the medium, respectively, in a manner that considers the spatial relationship of the sensors and actuators to the medium;
means for computing a transform of the system model with respect to the spatial variable;
means for solving linear matrix inequalities to generate auxiliary variables;
means for performing an inverse transform on the auxiliary variables; and
means for computing an estimator operator and a control operator for a model-based estimator control system.

28. The designer of claim 27, wherein the means for computing a transform of the model with respect to the spatial domain is accomplished using a Fourier transform.

29. The designer of claim 27, wherein the means for solving linear matrix inequalities to generate auxiliary variables is accomplished using algebraic Ricatti equations.

30. The designer of claim 27, wherein said system model is spatially invariant.

31. The designer of claim 27, wherein said estimator operator acts on estimation error through convolution with respect to a spatial variable to generate a state estimate, and further comprising a control output generator which applies the control operator to the state estimate through convolution with respect to the spatial variable.

32. The designer of claim 27, wherein the estimator operator and the control operator are localized in space.

33. The designer of claim 27, wherein the estimator operator and the control operator are independent of time.

34. The designer of claim 27, wherein the estimator operator and the control operator minimize quadratic objective functions.

35. A controller for minimizing quadratic performance criterion of a spatially invariant medium by optimizing model-based controller logic that controls an array of input and output devices being spatially distributed about the medium, the controller comprising:
a processor coupled to (i) the array of input devices to measure a spatial variable experienced by the medium and (ii) the array of output devices to affect the medium in a manner related to the spatial variable, the processor including:
an estimator operator defined by:

$$\frac{\partial}{\partial t}\psi_K(x,t) = A\psi_K(x,t) + B_2 u(x,t) + L(C_2\psi(x,t) - C_2\psi_K(x,t));$$

a control output generator defined by:

$$u(x,t) = F\psi_K(x,t);$$

$\psi_K$ representing an estimate of the present state of the system at a position x and a time t, L representing an estimator operator, A, $B_2$, and $C_2$ representing linear operators, u representing a control operator being applied to $\psi_K$, and F representing a control operator, wherein L acts on estimation error through convolution with respect to a spatial variable to generate a state estimate and the control output generator applies F to the state estimate through convolution with respect to the spatial variable.

36. The controller of claim 35, wherein L and F are localized in space.

37. The controller of claim 35, wherein L and F are independent of time.

38. The controller of claim 35, wherein L and F minimize quadratic objectives.

* * * * *

UNITED STATES PATENT AND TRADEMARK OFFICE
CERTIFICATE OF CORRECTION

PATENT NO. : 6,560,493 B1
DATED : May 6, 2003
INVENTOR(S) : Munther A. Dahleh, Bassam Bamieh and Fernando Paganini It is certified that error appears in the above-identified patent and that said Letters Patent is hereby corrected as shown below:

Column 26,
Line 28, between the words "operator" and "quadratic", insert -- minimize --;

Column 27,
Lines 39-40, delete "controlling" and insert -- computing --.

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,560,493 B1  
DATED : May 6, 2003  
INVENTOR(S) : Munther A. Dahleh, Bassam Bamieh and Fernando Paganini It is certified that error appears in the above-identified patent and that said Letters Patent is hereby corrected as shown below:

<u>Title page,</u>  
Item [73], Assignee, after "Massachusetts Institute of Technology, Cambridge, MA (US)" please insert -- and University of California, Santa Barbara, CA (US) --.

Signed and Sealed this

Second Day of December, 2003

JAMES E. ROGAN  
*Director of the United States Patent and Trademark Office*